US011964451B2

(12) United States Patent
Thangamani et al.

(10) Patent No.: US 11,964,451 B2
(45) Date of Patent: Apr. 23, 2024

(54) INTELLIGENT VEHICLE CONTROL SYSTEM WITH AN INTEGRATED GLAZING

(71) Applicants: SAINT-GOBAIN GLASS FRANCE, Courbevoie (FR); Arunvel Thangamani, Chennai (IN)

(72) Inventors: Arunvel Thangamani, Tamil Nadu (IN); Robin C Jayaram, Kerala (IN); Samson Richardson D, Tamil Nadu (IN)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 417 days.

(21) Appl. No.: 17/274,653

(22) PCT Filed: Sep. 10, 2019

(86) PCT No.: PCT/IN2019/095001
§ 371 (c)(1),
(2) Date: Mar. 9, 2021

(87) PCT Pub. No.: WO2020/053901
PCT Pub. Date: Mar. 19, 2020

(65) Prior Publication Data
US 2021/0268776 A1 Sep. 2, 2021

(30) Foreign Application Priority Data
Sep. 10, 2018 (IN) .............................. 201841033995

(51) Int. Cl.
*B32B 17/10* (2006.01)
*B60W 50/14* (2020.01)
*H04W 4/80* (2018.01)

(52) U.S. Cl.
CPC ....... *B32B 17/10036* (2013.01); *B60W 50/14* (2013.01); *H04W 4/80* (2018.02); *B60W 2050/146* (2013.01)

(58) Field of Classification Search
CPC .. B32B 17/10036; B32B 17/10; B60W 50/14; B60W 2050/146; H04W 4/80
(Continued)

(56) References Cited
U.S. PATENT DOCUMENTS 6,275,157 B1 * 8/2001 Mays .................... G07C 5/085
340/572.5
7,999,682 B2 * 8/2011 Burnett ............ G06K 19/07327
340/572.1
(Continued)

FOREIGN PATENT DOCUMENTS

WO    WO 2007/122426 A1    11/2007

OTHER PUBLICATIONS

International Search Report and the Written Opinion of the International Searching Authority as issued in International Patent Application No. PCT/IN2019/095001, dated Dec. 20, 2019.

*Primary Examiner* — Hai V Tran
(74) *Attorney, Agent, or Firm* — Pillsbury Winthrop Shaw Pittman LLP

(57) ABSTRACT

An integrated glazing with a data transponder embedded between layers of glass is disclosed. The data transponder stores and processes data. The integrated glazing also includes a display unit including display elements disposed between layers of glass, communicating with the data transponder. The integrated glazing may comprise a data channel, a power channel, antenna and chip. An intelligent system is also disclosed including the integrated glazing, a reader device and a control system. The reader device is communicably coupled to the integrated glazing to generate signals based on the received data. The control system is (Continued)

communicably coupled to the integrated glazing and the reader device to process signals received from the reader device and perform pre-defined operations in response to the instructions and received signals.

27 Claims, 11 Drawing Sheets

(58) Field of Classification Search
USPC .......................................................... 343/713
See application file for complete search history.

(56) References Cited

U.S. PATENT DOCUMENTS

| | | |
|---|---|---|
| 9,403,477 B2 | 8/2016 | Richard et al. |
| 9,758,021 B2* | 9/2017 | Gansen .................. H01Q 1/325 |
| 10,303,035 B2* | 5/2019 | Brown ................ H04L 12/2803 |
| 11,494,605 B2* | 11/2022 | Thangamani .... G06K 19/07773 |
| 2006/0208904 A1* | 9/2006 | Ohara .................. H01Q 1/2208 |
| | | 343/873 |
| 2015/0151611 A1 | 6/2015 | Gansen et al. |
| 2016/0159282 A1 | 6/2016 | Kurihara |
| 2021/0256230 A1* | 8/2021 | Holtstiege ........ G06K 19/07773 |

* cited by examiner

FIG. 6

INTELLIGENT VEHICLE CONTROL SYSTEM WITH AN INTEGRATED GLAZING

CROSS-REFERENCE TO RELATED APPLICATIONS

This application is the U.S. National Stage of PCT/IN2019/095001, filed Sep. 10, 2019, which in turn claims priority to Indian patent application number 201841033995 filed Sep. 10, 2018. The content of these applications are incorporated herein by reference in their entireties.

TECHNICAL FIELD

The present disclosure relates generally to automating operations in a vehicle in a secure manner and in particular, a system for automating operations/components in a vehicle using an integrated glazing.

BACKGROUND

Background description includes information that may be useful in understanding the present disclosure. It is not an admission that any of the information provided herein is prior art or relevant to the presently claimed invention, or that any publication specifically or implicitly referenced is prior art.

Existing high-end vehicles include control systems for automating vehicle operations. The control systems provide ease of use to passengers and ensure efficiency in operating vehicle components. However, existing control systems for vehicles have many shortcomings. For example, control systems lack the ability to adjust vehicle operation based on real-time values and user preferred settings. Typical control systems are limited to a specific function such as engine controls, speed controls, temperature controls and the like.

Typical vehicle control operations include locking/unlocking of vehicles, control of HVAC, infotainment controls, heating grid controls, GPS navigation and the like. Existing prior art teaches a method and system for selective activation of a near field communication (NFC) module in the vehicle. The vehicle NFC module may be part of a vehicle communication and access system capable of initiating various vehicle functions, such as unlocking one or more doors of the vehicle or starting a motor or engine of the vehicle. However, the vehicle NFC module is not tamper-proof and does not provide seamless control of other vehicle operations/components.

Another prior art teaches a method for wirelessly registering and monitoring a vehicle occupying a defined restricted-access zone by communicating vehicle identity data and location data via a transceiver information from a vehicle by a wireless signal to an intelligent wireless communication device suitably mounted at a location to identify and monitor the vehicle within a defined restricted access zone. Thereafter, the wireless signal in the intelligent wireless registers communication device thereby ascertaining the identity and location of the vehicle within the defined restricted-access zone. However, the current prior art does not function effectively when the vehicle is not accessible to GPS. Also, the current prior art is limited to communicating location data and does not communicate other parameters pertaining to the vehicle.

Further, existing vehicles do not support operations that are triggered by an RFID/NFC. Existing vehicles incorporate an RFID tag (for example, FASTag) that is attached to the vehicle to automate operations such as payment at the toll. In the above scenario, the RFID tag stores information pertaining to the vehicle, insurance, and other payment information. Another prior art U.S. Pat. No. 7,999,682 also discloses a method of mounting RFID tags on the laminated glazing using a sticker transponder. However, the RFID tag is not tamper-proof and is prone to misuse. Further, the existing RFID tag does not provide seamless connectivity with other vehicle components and control system of the vehicle. There exists a need for a secure, tamper-proof solution to perform vehicle operations involving RFID/NFC tags.

The automotive laminated glass is particularly designed to provide the driver a view of the forward region of the vehicle during driving and rearward region of the vehicle during reversing and other maneuvers. More recently, automobile laminated glass has shown a trend to incorporate completely new functions, such as insertion of light-emitting diodes (LEDs) into a laminated glass for lighting units, indicator lights, thereby providing a better alert indication to the driver as compared to a dashboard. Generally, the insertion of light-emitting diodes (LEDs) into an automotive laminated glass serves as indicator light display intended for the driver of the vehicle or the passengers or is used for aesthetic of the vehicle or for internal lighting. However, existing automotive laminated glass does not control operations in a vehicle nor do the laminated glass display alerts in response to the operations.

A laminated glazing, which incorporates an electrical device such as data transponders, electroluminescent devices and sensors is desirable due to operational ease and to automate the vehicle operations. WO2007122426 provides one example of such automobile glazing. It discloses a laminated glazing, in the form of a roof window comprising an electrical device in the form of an electroluminescent lamp integrated into the laminate construction. Further, US20160159282 provides a plurality of rectangular organic electroluminescent displays laminated in the laminated glass. However, the electroluminescent device integrated into the laminated glazing as mentioned in the above prior arts is only for lighting and/or aesthetic purpose. In addition, the above-mentioned prior arts also fail to disclose the vehicle control functionalities associated with the electroluminescent device.

However, there are various challenges involved in seamlessly integrating both the display device and the data transponder onto the laminated glazing. Typically, each data transponder work at different frequencies based on the application. Hence, while embedding various data transponders and display devices between the laminate, it is essential to have an optimized inter-device spacing and device isolation to achieve best communication performance (transmission/reception). Further, interference between the different components of the integrated glazing such as data transponder devices, antenna, sensors and display can affect the communication to other control systems in the vehicle. Interference from the wiper system in the glazing, heating network and display clip-ons can affect the accessibility and communication of the integrated glazing. Thus, there exists need to develop a laminated glazing overcoming the above-mentioned challenges.

Hence, it would be desirable to provide an integrated glazing with interactive devices that can communicate with a control system of the vehicle to automate vehicle components and their operations. Further, it is required to have an integrated glazing incorporated with interactive devices that are not placed on the dashboard or the interior of the vehicle with restricted/limited access from outside the vehicle. Also, it is desirable to have a reliable, secure, tamper-proof, and water resistant system that performs operations such as unlocking the car, activating engine and air conditioning, user identification, payment and the like. Further, it is desired to have a system that incorporates data transponder in the integrated glazing for storing and transmitting information.

SUMMARY OF THE DISCLOSURE

One aspect of the present disclosure provides an intelligent control system 101 for a vehicle. The intelligent control system 101 comprises an integrated glazing, a reader device, and a control system.

The drawbacks discussed in the background are overcome by an improved integrated glazing that when incorporated in any automotive device provides control of pre-defined operations in a vehicle. The integrated glazing of the present disclosure along with a control system forms an intelligent system that performs pre-defined operations in a vehicle.

One aspect of the present disclosure provides an integrated glazing a data transponder embedded between one or more layers of glass. The data transponder stores and processes data pertaining to vehicle configuration, vehicle ID/VIN Number, user ID, user payment credentials, user information, user-customized/personalized settings, license details, service information, insurance details, website/URL, pre-defined location boundary information and location information. The integrated glazing also includes a display unit comprising display elements disposed between layers of glass, communicating with the RFID tag. The integrated glazing also includes a data channel coupled to the data transponder, wherein the coupling is one of wired or wirelessly communicate on. The integrated glazing also includes a power channel which is wired or wirelessly integrated to the glazing. In an embodiment, the data transponder is one of a passive RFID, active RFID, passive NFC, active NFC. In another embodiment, the data transponder includes one or more sensors embedded therein.

Another aspect of the present disclosure teaches an intelligent system for performing pre-defined operations in a vehicle using the integrated glazing. The intelligent system includes the integrated glazing, a reader device, and a control system. In accordance with the disclosure, the integrated glazing is configured to store data and transmit the data. The data comprises a fixed data and a variable data received from a sensor system of the vehicle. The reader device is communicably coupled to the integrated glazing to generate signals based on the received data. The control system is communicably coupled to the integrated glazing and the reader device. The control system comprises a memory and a processor. The memory is configured to store instructions and the processor is configured to compare signals received from the reader device with a set of preferred limits to perform pre-defined operations in response to the instructions and received signals.

According to an embodiment of the present invention, the intelligent system includes a sensor system disposed on the vehicle and configured to generate sensor data. The sensor system is communicably coupled with the integrated glazing and the control system, wherein the sensor data comprises temperature, humidity, light, acoustic, vibration, stress, displacement, position, touch, force, occupancy, proximity, tire pressure, speed values, IR/UV sensors, camera. The intelligent system also includes a server wirelessly communicating with the reader device and the control system via the integrated glazing. The intelligent system is configured to perform one or more pre-defined operations comprising:
enabling a geo-fencing alert on the display unit of the integrated glazing;
initiating payment and providing payment alert on the display unit of the integrated glazing; activating locking or unlocking of the vehicle;
activating HVAC control of the vehicle;
activating actuators for defogger and wiper control operations;
activating WiFi within the vehicle;
speed limit alerts on the display unit of the integrated glazing;
triggering an emergency phone call by the control system through the integrated glazing based on the contact information stored therein; and
providing notifications and sensor data value indications on the display unit of the integrated glazing.

In accordance with an embodiment of the present disclosure, the data comprising current vehicle location and pre-defined location boundary information is transmitted from the integrated glazing. The data is received by the reader device. Thereafter, the current vehicle location is compared with a pre-defined location boundary to determine whether there is a deviation in location based on the comparison. Based on the analysis, an alert is provided on the display unit when a deviation in location is determined. The alert comprises an error indication on the display, icons in one of red, blue or green color and emoticons.

In accordance with an embodiment of the present disclosure, data comprising vehicle ID and user payment credentials are transmitted through the integrated glazing. The data is received by the reader device and the control system. Thereafter, the vehicle ID and user payment credentials are authenticated by the control system. To authenticate the user payment credentials, an application is triggered on a reader device or a mobile device. The user is requested to verify the payment credentials on the reader device or mobile device using one of OTP, password, fingerprint, biometric and the like. Once the user is authenticated, the payment is initiated by the control system when a payment request is sent to a payment gateway. On successful completion of payment, an alert is displayed on the display unit of the integrated glazing.

In accordance with an embodiment of the present disclosure, the data comprising pre-set sensor values of temperature, humidity, light, acoustic, vibration, stress, displacement, position, touch, force, occupancy, proximity, tire pressure, speed values are transmitted from the integrated glazing. Further, the real-time sensor data is received from the plurality of sensors by the control system. The plurality of sensors is positioned within the glazing or within the vehicle. The pre-set sensor values are compared with the real-time sensor data by the control system. The control signals are generated by the control system based on the comparison. Thereafter, the control system activates HVAC control based on the control signal to perform one of temperature variation or humidity variation. The control system also activates functional glazing control based on light and temperature variation. Further, openable glazing is activated based on the control signal to regulate the incoming noise. The vehicle engine is activated or deactivated based on the control signal. Finally, notifications are provided on the display unit corresponding to the status of temperature variation, humidity variation, light variation, and engine activation or deactivation.

Another aspect of the present disclosure is to provide a display system for a vehicle comprising one or more sensors to detect one or more conditions. The integrated glazing is integrated with one or more electroluminescent devices to display one or more conditions detected by one or more sensors. The electronic circuitry connected to one or more electroluminescent devices through one or more connector elements to generate, capture and transmit signals of one or more conditions.

Another aspect of the present disclosure is to provide notifications on the display unit of the integrated glazing to display status and strength of Bluetooth connectivity, Wi-Fi, phone call notifications, VIN number, inspection status, pollution control status, insurance compliance status, navigation details, vehicle operations, sensor status and location information and the like Other features and aspects of this disclosure will be apparent from the following description and the accompanying drawings.

BRIEF DESCRIPTION OF THE DRAWINGS

Embodiments are illustrated by way of example and are not limited in the accompanying figures.

FIG. 6 illustrates a user interface on the integrated glazing providing alert according to an exemplary embodiment of the present disclosure.

Figure 1A:
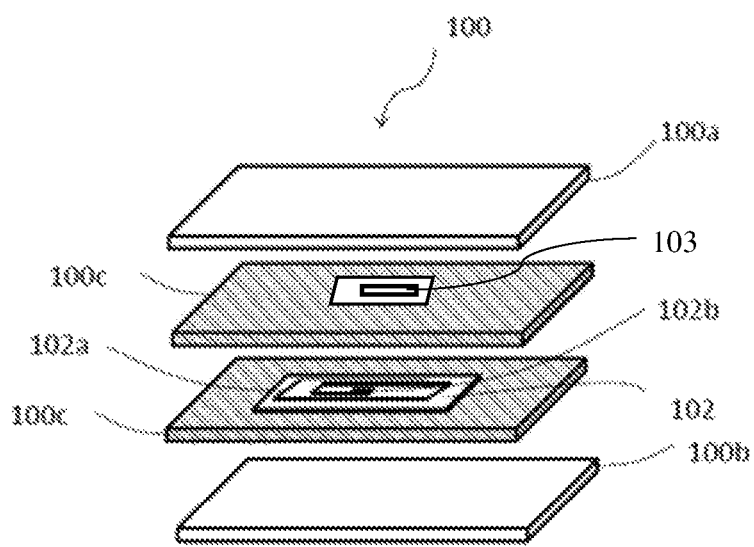
FIG. 1A illustrates an exploded diagram of the integrated glazing present in the intelligent system according to an embodiment of the present disclosure.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the disclosure.

DETAILED DESCRIPTION

The present disclosure is now discussed in more detail referring to the drawings that accompany the present application. In the accompanying drawings, like and/or corresponding elements are referred to by like reference numbers. Wherever possible, the same reference numbers will be used throughout the drawings to refer to the same or the like parts.

The drawbacks of the prior art are overcome by an improved integrated glazing 100 that when incorporated in any automotive device provides control of vehicle components and vehicle operations. The integrated glazing 100 of the present disclosure communicates wirelessly with a control system 106 and other vehicle components/devices. The control system 106 receives data from the integrated glazing 100 and an external system and further executes the data based on the instructions stored therein. The control system 100 further generates response instructions/control signals that are based at least in part of the data. Further, the response instructions control the operation of the vehicle or vehicle components/devices in a manner that was selected based on the data and stored instructions. Some of the operations controlled by the intelligent system include enabling/disabling Wi-Fi, engine power On/Off, geo-location service/alerts, launching specific applications on a mobile device in response to the information read from the integrated glazing 100.

In an embodiment of the present invention is thus disclosed an integrated glazing 100 for performing pre-defined operations in a vehicle. The glazing 100 comprises one or more layers of glass. Further, the glazing has at least one data transponder 102 embedded between the layers of glass. The data transponder is capable of storing and also processing data. The data stored and processed by said data transponder 102 pertains to vehicle configuration, vehicle ID/VIN Number, or user ID. The data may also pertain to user payment credentials, user information, user customized/personalized settings, license details, service information, insurance details, website/URL, pre-defined location boundary information and location information. It would be appreciated by a person skilled in the art that the data instances of the stored and processed as indicated herein relates to the pre-defined operations in a vehicle and are instances for enabling the skilled person to read and appreciate the invention. Further, the glazing includes a display unit 103 comprising display elements disposed between layers of glass and configured to communicate with the data transponder. The glazing further includes a data channel coupled to the data transponder. The coupling is one of wired or wireless communication. The glazing further has a power channel 102a, wired or wirelessly integrated to the glazing. The data transponder may be positioned on the outer layers of the glass. The data transponder may comprise an inbuilt antenna and a chip.

Another aspect of the present disclosure is to provide an improved laminated glass for the windshield of a vehicle incorporating electronic components such as data transponders, antenna, display elements, and one or more sensors, thus enabling additional functionality as compared to a usual windshield.

FIG. 1A is an exploded of the integrated glazing 100 present in the intelligent system, according to an embodiment of the present disclosure. The integrated glazing 100 is a smart device comprising one or more data transponders 102, display units 103 and antennas. The integrated glazing 100 forms the core of the system and is configured to function as in interface for a human vehicle communication and also triggers communication with other devices/components in the system/vehicle. Further, the integrated glazing 100 enables safe, secure communication and controls within the vehicle since the glazing is tamper-proof.

In an embodiment of the present disclosure, the integrated glazing comprises one or more data transponders (data transponder device) 102, a display unit 103, a data channel 102a and a power channel 102b embedded between a first substrate 100a and a second substrate 100b as shown in FIG. 1A. The first substrate 100a and the second substrate 100b is one of a glass or a polymer. One or more interlayers 100c are provided between the first substrate 100a and the second substrate 100b to form a laminated assembly. The data transponder device 102 is integrated between the first substrate 100a, second substrate 100b, or one or more interlayers 100c. The data transponder 102 present in the integrated glazing 100 is at least on of active RFID, passive RFID, semi-passive RFID, active NFC, passive NFC. The data transponder device 102 is further coupled to a data channel 102a and a power channel 102b. The data transponder device 102 also comprises one or more antennas and a chip. The antenna present in the data transponder device 102 is configured to receive and transmit signals. The antenna is at least one of FM/AM radio antenna, GPS, Bluetooth, WiFi, TV, digital TV/radio and the like. The GPS antenna may be used in low strength areas for enhanced reception. Further, the Bluetooth and WiFi-based antennas enhance the communication range of the external system with internal control/computing system. The antenna is completely embedded or coupled with an external electronic circuitry The chip of the data transponder device is configured to process information. The chip also comprises a memory with a read-only portion and a re-writable portion. The read-only portion stores fixed data which cannot be altered and the re-writable portion stores variable data which can be transformed.

In an embodiment, the integrated glazing includes also actuators coupled to the data channel 102a and the power channel 102b that is configured to activate heating grid network, drives for controlled heating, adjusting the glazing, sensor position, and external device alignment. The display unit 103 comprises one or more display devices. Examples of display devices include electrochromic, thermochromic, photochromic, mechanoluminescence, EL, LED, OLED, HUD/projection films and the like. In an embodiment therein, the integrated glazing may include one or more sensors embedded within layers of glass. Examples of sensors include temperature, humidity, Imaging (IR, UV or visual), vibration, stress, displacement, position, touch, force, proximity, occupancy and the like. The integrated glazing 100 is designed to be part of a windshield, windows, mirrors, side-light, backlight, quarterlight, encapsulated glazing or interior glasses used for partition or surfaces within the vehicle. In an embodiment, the integrated device or components or antenna may be on any of the faces of the glass surface or within the encapsulation of the encapsulated glazings.

Figure 1B:
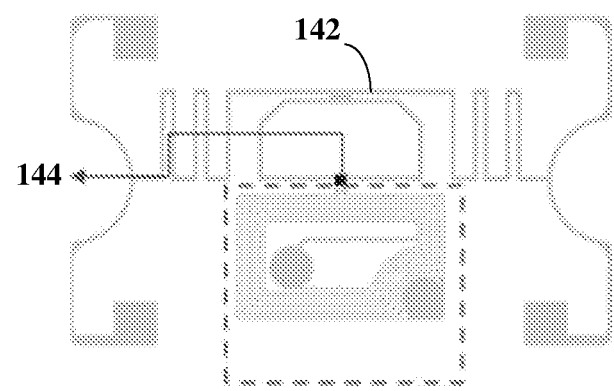
FIG. 1B illustrates a dual frequency antenna implemented within the integrated glazing according to an embodiment of the present disclosure.

FIG. 1B illustrates a dual frequency antenna implemented within the integrated glazing 100. In an embodiment, the RF tags are configured to operate on different frequencies and share a common storage chip which is being integrated in the laminated glazing. The laminated glazing is used in operations where the data retrieval is possible through one or more frequencies.

The RF tag can operate in both High frequency in the range of 13.56 MHz and UHF range of 860-960 MHz. In the antenna design, a portion 142 of the antenna is designed to be sensitive for high frequency RF Signals and the other portion 144 is sensitive for Ultra High frequency. The embedded tags are used for long-range application purposes, and the NFC Technology is used to exchange data in close proximity. The standard chip is shared by two different antennae. The chip comprises split memory for data specific to RFID and data specific to NFC data. The data is transmitted from the RFID tag based on the type of reader placed over (UHF or HF reader). Typically, the lamination of the multi-frequency RF is performed without causing any defects inside glazing.

Figure 1C:
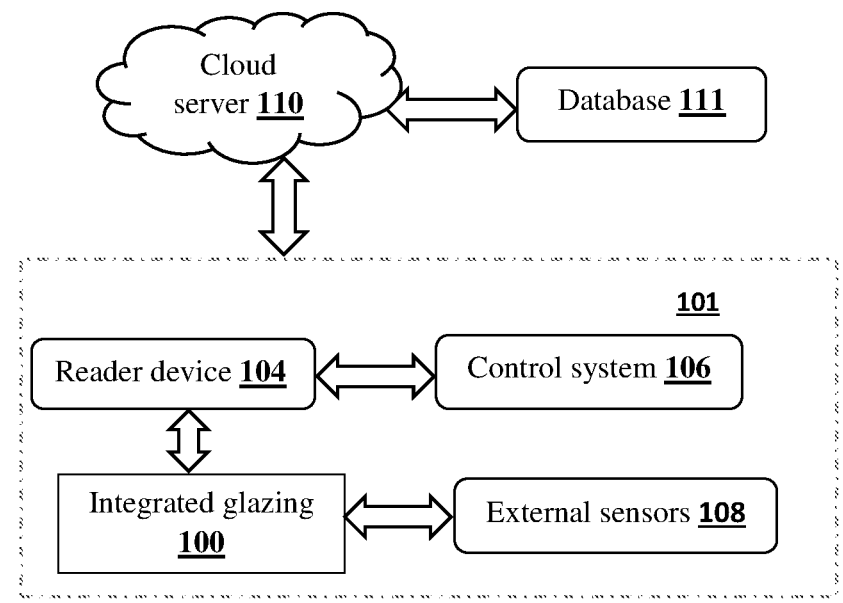
FIG. 1C illustrates a block diagram of an intelligent control system according to an embodiment of the present disclosure.

FIG. 1C is a block diagram of an intelligent control system 101. The intelligent control system 101 prominently includes a control system 106 and an integrated glazing 100. With respect to FIG. 1C, the intelligent system includes a reader device 104 that provides a first level of communication with the integrated glazing 100. The communication is programmed to be active in intervals, continuous or batches based on the application requirement. In an example, the reader device 104 is one of an RF reader/writer device configured for RF-based tags interaction or an NFC reader. The reader is one of a data acquisition system or mobile device or a handheld device or iPad or NFC/RFID reader device. The reader device 104 is a wired or wireless device depending on application requirements. The reader device 104 is configured to read data stored in the integrated glazing 100. The reader device is positioned within the vehicle or exterior to the vehicle. In response to the data received from the integrated glazing 100, the reader device triggers applications and further transmits the data and signals to the control system 106.

In an embodiment of the present disclosure, the control system 106 is communicably coupled to both the reader device 104 and the integrated glazing 100. In an embodiment, the control system 106 is positioned within the vehicle. In another embodiment, the control system 106 is positioned at any a location exterior to the vehicle. The control system 106 is also configured to communicate with a cloud server 110 or local server or a smart information device, which is external to the intelligent system. Optionally, the reader device 104, depending on type of data being handled may directly communicate to the cloud server 110 or local server or a smart information device (data Storage and analytics system) which is external to the Smart system. The cloud server 110 is communicably coupled to a database 112 for storing server data received from the vehicle. Further, the cloud server 110 can retrieve server data and communicate with external control systems to perform vehicle operations. The control system 106 comprises a processor and a memory. The processor may be any conventional processor, such as commercially available CPUs or hardware-based processor. It will be understood by those of ordinary skill in the art that the processor, computer, or memory may actually comprise multiple processors, computers, or memories that may or may not be stored within the same physical housing. In various aspects described herein, the processor may be located remotely from the vehicle and further communicate with vehicle wirelessly. In other aspects, some of the processes described herein are executed on a processor disposed within vehicle and others by a remote processor. The memory is configured to store instructions accessible by the processor. Further, the memory includes data that is executed by the processor. Memory is any storage device, a computer-readable medium, or another medium that stores data that may be read with the aid of an electronic device, such as a hard-drive, memory card, ROM, RAM, and write-capable or read-only memories. In an example, data stored in the memory includes detailed map information and traffic pattern model information that may be retrieved, stored or modified by the processor in accordance with instructions.

In accordance with an embodiment the processor receives a data log comprising stored data and additional data received from the data transponders 102 and external sensors 108. The processor executes the data log and generates response instructions/control signals that are based at least in part of the additional data. Further, the response instructions control the operation of the vehicle or vehicle components/devices in a manner that was selected based on the data log. Also, the processor is configured to compare data received with a set of preferred limits stored therein to perform pre-defined operations in response to the data received from the integrated glazing 100 and the reader device 104. In accordance with an embodiment, the intelligent system is configured to perform the pre-defined operations listed below:

a. enabling a geo-fencing alert on the display unit of the integrated glazing;
b. initiating payment and providing payment alert on the display unit of the integrated glazing;
c. activating locking or unlocking of the vehicle;
d. activating HVAC control of the vehicle;
e. activating actuators for heating grid, defogger and wiper control operations;
f. speed limit alerts on the display unit of the integrated glazing;
g. providing notifications and sensor data value indications on the display unit of the integrated glazing;
h. enabling/disabling Wi-Fi for the passenger;
i. triggering a phone call in case of emergency or message by the control system through the integrated glazing based on the contact information stored therein;
j. engine power On/Off with NFC or Bluetooth connected device; and
k. In-cabin infotainment switch on-off with NFC In an embodiment of the present disclosure, the control system 106 is configured to communicate with internal vehicle systems such as brake controls, acceleration controls, HVAC controls and other controls to enable pre-defined operations. Further, the aforementioned pre-defined operations are controlled through the response instructions/control signals sent from the control system 106 to the associated internal vehicle systems. Based on the operations triggered by the control system 106, corresponding alerts and notifications are displayed on the display unit 103 of the integrated glazing 100. Further, the control system 106 activates Wi-Fi within the vehicle and also activates actuators for heating, defogger and wiper control operations. The control system 106 also communicates with the integrated glazing 100 to display status and strength of Bluetooth connectivity, Wi-Fi, phone call notifications, VIN number, inspection status, pollution control status, insurance compliance status, navigation details and location information. The alerts are displayed on the integrated glazing 100 in one of red, blue, green, orange colors or as symbols, arrows and emoticons, thereby indicating the status of pre-defined operations mentioned above.

In another exemplary embodiment, the intelligent system can be configured to trigger an emergency phone call through the integrated glazing 100 based on the contact information stored therein. The antennas of the integrated glazing 100 communicate with the cloud server 110 or a mobile network to place a phone call.

While certain aspects of the present disclosure are particularly useful in connection with specific types of vehicles, vehicle may be any type of vehicle including, but not limited to, automobiles, trucks, motorcycles, buses, airplanes, helicopters, lawnmowers, recreational vehicles, amusement park vehicles, farm equipment, construction equipment, trams, golf carts, trains, and trolleys.

Figure 1D:
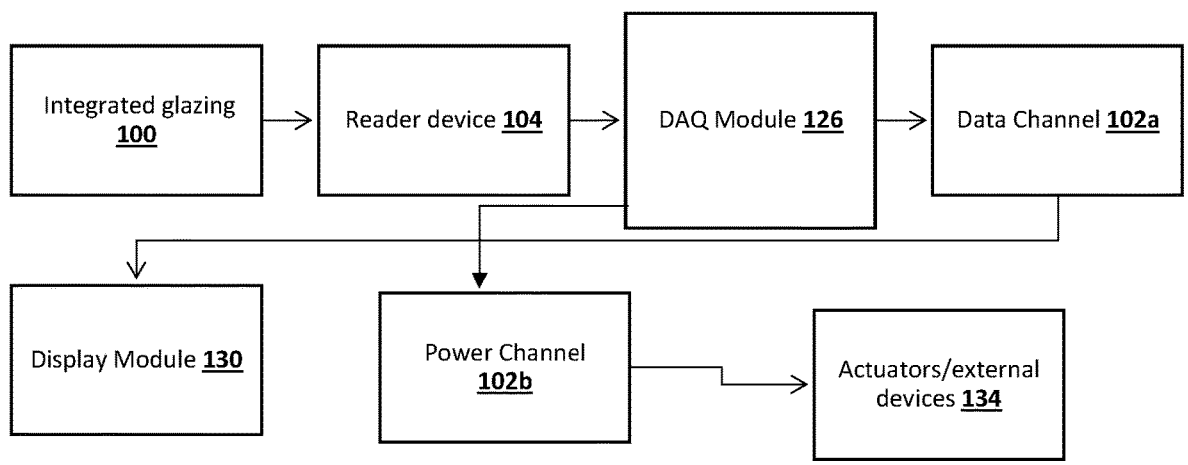
FIG. 1D illustrates a block diagram showing the flow of information between the integrated glazing 100 and the vehicle according to an embodiment of the present invention.

FIG. 1D is a block diagram illustrating the flow of information between the integrated glazing 100 and the vehicle. The integrated glazing 100 embedded with RFID/NFC tag comprises a data channel 102a and a power channel 102b. The reader device 104 receives data from the integrated glazing 100 and transmits the data to the DAQ module 126 located within the vehicle. The DAQ module 126 is the control system of the vehicle. The DAQ module 126 transmits signals to the display module 130 within the integrated glazing 100. The signals trigger notifications on the display module 130. The DAQ module 126 further sends trigger signals to the power channel 132. The power channel 132 operates the actuators and external devices to perform predefined operations based on the instructions received from the RFID/NFC and the DAQ module 126. The pre-defined operations triggered by the power channel include activating locking or unlocking of the vehicle, activating HVAC control of the vehicle, activating actuators for heating grid, defogger and wiper control operations.

In an embodiment of the present invention is disclosed an intelligent system for performing pre-defined operations in a vehicle using the integrated glazing. The disclosed system comprises an integrated glazing configured to store data. The integrated glazing comprises one or more layers of glass, and a data transponder embedded between the layers of glass. The data transponder stores and processes data pertaining to vehicle configuration, vehicle ID/VIN Number, user ID, user payment credentials, user information, user customized/personalized settings, license details, service information, insurance details, website/URL, warranty information, vehicle service schedule, pre-defined location boundary information and location information. The integrated glazing further comprises a display unit disposed between layers of glass, communicating with the data transponder. The display unit comprises display elements, a data channel coupled to the data transponder, and the coupling is one of wired or wirelessly communication. The glazing further includes a power channel, wired or wirelessly integrated to the glazing. In this embodiment of the invention, the data comprises a fixed data and a variable data received from a sensor system of the vehicle, and the integrated glazing further transmits both the permanent data and the variable data. Further, the system further comprises a reader device communicably coupled to the integrated glazing to generate signals based on the received data and a control system communicably coupled to the integrated glazing and the reader device. The control system comprises a memory and a processor, wherein the memory is configured to store instructions and the processor is configured to compare signals received from the reader device with a set of preferred limits to perform pre-defined operations in response to the instructions and received signals. The integrated glazing is communicatively coupled to a mobile device for transmitting alerts and notifications. The system is further configured to communicate with another vehicle for transmitting alerts and notifications.

The system disclosed in the above embodiment may further include a sensor system disposed on the vehicle that is configured to generate sensor data. The sensor system is communicably coupled with the integrated glazing and the control system, wherein the sensor data comprises temperature, humidity, light, acoustic, vibration, stress, displacement, position, touch, force, occupancy, proximity, tire pressure, speed values, IR/UV sensors, camera. The system further comprises a server wirelessly communicating with the reader device and the control system via the integrated glazing.

The intelligent system is further configured to perform one or more pre-defined operations. The pre-defined operations comprise:
  i. enabling a geo-fencing alert on the display unit of the integrated glazing;
  ii. initiating payment and providing payment alert on the display unit of the integrated glazing;
  iii. activating locking or unlocking of the vehicle;
  iv. activating HVAC control of the vehicle;
  v. activating actuators for defogger and wiper control operations;
  vi. activating Wi-Fi within the vehicle; speed limit alerts on the display unit of the integrated glazing;
  vii. triggering an emergency phone call or message by the control system through the integrated glazing based on the contact information stored therein; and
  viii. providing notifications and sensor data value indications on the display unit of the integrated glazing.

Figure 2:
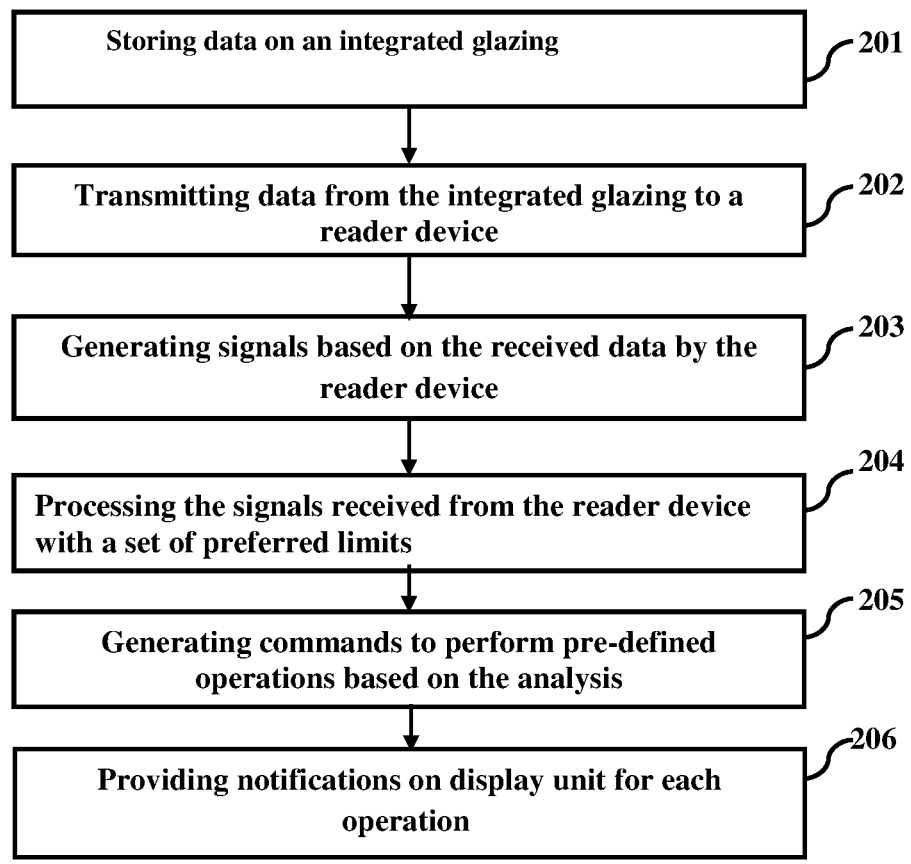
FIG. 2 illustrates a flowchart showing the sequence of operations performed by the intelligent vehicle system according to an embodiment of the present disclosure.

FIG. 2 is a flowchart illustrating the sequence of operations performed by the intelligent vehicle system. Initially, the integrated glazing 100 stores required information within the data transponder (201). The data transponder 102 includes fixed data and variable data programmed thereto, which are used for initiating vehicle operations/controls. The fixed data is programmed by a user or a manufacturer initially with a unique ID and information pertaining to the vehicle and vehicle owner. Examples of fixed data also include information including VIN number, chassis number, pollution control status, insurance number, owner contact number, emergency contact number, fleet service center name, map information and the like. Examples of variable data include user preferred values for the vehicle control circuits like HVAC, temperature, heating grid network, wiper control, throttle control and the like. The variable data also includes user preferred settings programmed by the user for infotainment, Wi-Fi authorization, and payment details. The integrated glazing 100 also communicates with a sensor system present in the vehicle to update the variable data corresponding to the temperature, humidity, light, proximity, engine temperature tire pressures, fuel levels, rpm. The variable information is continuously modified in real-time based on feedback/commands from the control unit. The sensors can also optionally work in tandem with the fixed data in the data transponders 102 wherein the absolute values are measured by the sensors. The data stored in the data transponder is transmitted at a regular or intermittent time basis (202). The transmitted data is received by the reader device 104 which is placed inside the vehicle or outside the vehicle. The reader device 104 generates signals based on the received data and optionally triggers applications in response to the received data (203). The information from the reader device 104 is transferred to the control/computing system by wired or wireless means. In an example, if the mobile device is used as a reader device, then the mobile device reads information from the glazing to trigger the control system, which is positioned within the vehicle or externally. The mobile device also launches applications based on the read information. The control system 106 also receives sensor data from one or more sensors present in the integrated glazing 100 and from the external sensors 108. The control system 106 processes (or analyses) the signals received from the reader device 104 with a set of preferred limits (204). The set of preferred limits includes but not limited to data corresponding to GPS data, emergency contact numbers, fleet service center, traffic law, danger levels, temperature, humidity, light, proximity, engine temperature tire pressures, fuel levels, and rpm. On completion of processing, the control system 106 generates commands to perform pre-defined operations (205). The control system 106 also provides notifications and alerts on the display unit of the integrated glazing 100 to indicate the status of each pre-defined operation (206). Examples of alert on the display unit includes hazard signal, signal strength, payment status display, digital values/levels for sensor measurements. In the present disclosure, the RF-based glazing would be the first level of communication followed by the triggering of subsequent systems. Thereafter, the control system communicates with the integrated glazing to transmit signals to a display driver, which further activates the display unit.

In an exemplary embodiment, the intelligent system performs locking/unlocking of the vehicle by using a reader device. In this scenario, the reader device 104 is a handheld device or a mobile phone. The reader device 104 is positioned from outside near to the integrated glazing 100 to access user credentials and authenticate the user. Thereafter, the variation of the read values is compared with the set or preferred limits by the control/computing system and appropriate commands or signals are sent to the vehicle control system 106. After authentication, the control system 106 generates commands to lock/unlock a door of the vehicle. In this scenario, the display unit 103 of the integrated glazing 100 can acknowledge the proximity of a user using the reader/mobile device. In another example, based on the commands provides by the intelligent system, activation and deactivation can be performed for control circuits for HVAC, heating grid network, wiper control, throttle control, engine, brake, steering unit. The heating grid network is activated based on input from the moisture/fog levels measured by a plurality of sensors.

In another example, the display unit of the integrated glazing could be a HUD system that is controlled by gestures to control the location, type of information, brightness and the like. The intelligent system could be implemented for vehicle programming comprising speed, light control (internal, headlamp, fog lamps), horn dB level, camera control. Further, the intelligent system can provide autonomous system support for proximity and inter-vehicle communication. The intelligent system comprises vibration sensors for crash detection and intimation. The intelligent system comprises acoustic sensors to determine external warning or noise signals and for voice recognition activation. In another example, the intelligent system generates messages, email by communicating with a cloud server. In an example, the intelligent system also triggers messages to a dealer via GPS/GSM antenna places in the integrated glazing to place a re-order during glass breakage. Further, the intelligent system provides notifications about service dates to a user.

Geo-Fencing

Figure 3:
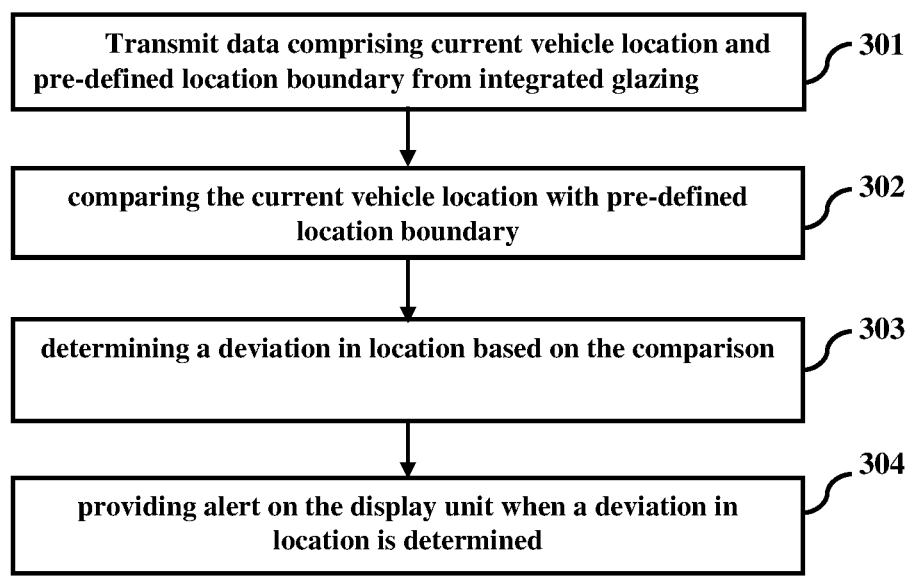
FIG. 3 illustrates a flowchart showing a method for enabling a geo-fencing alert operation by the intelligent system according to an embodiment of the present disclosure.

FIG. 3 is a flowchart illustrating a method for enabling a geo-fencing alert operation by the intelligent system. In accordance with an embodiment of the present disclosure, the data comprising current vehicle location and pre-defined location boundary information is transmitted from the integrated glazing (301). The data is received by the reader device (302). Thereafter, the current vehicle location is compared with a pre-defined location boundary to determine whether there is a deviation in location based on the comparison (303). Based on the analysis, an alert is provided on the display unit when a deviation in location is determined (304). The alert comprises an error indication on the display, icons in one of red, blue or green color and emoticons.

In an example, when a vehicle parked in a basement, the GPS of the vehicle is not accessible for a user to navigate to a desired location. In this scenario, the integrated glazing of the present disclosure transmits map information to the reader device and the control system positioned within the vehicle. The control system processes the location information and provides navigation commands to reach the desired location. The navigation command includes route indicators that are displayed on the display unit of the integrated glazing as shown in Table 1.

TABLE 1

Display unit status for route indicators

| Position | Display unit (Glow) | Operations |
|---|---|---|
| A | ⇓ | Navigate backwards |
| B | ⇒ | Navigate to right |
| C | ⇑ | Navigate forward |
| D | ⇐ | Navigate to left |
| E | ⊘ | Stop/exceeding defined location |

Payment Process

Figure 4:
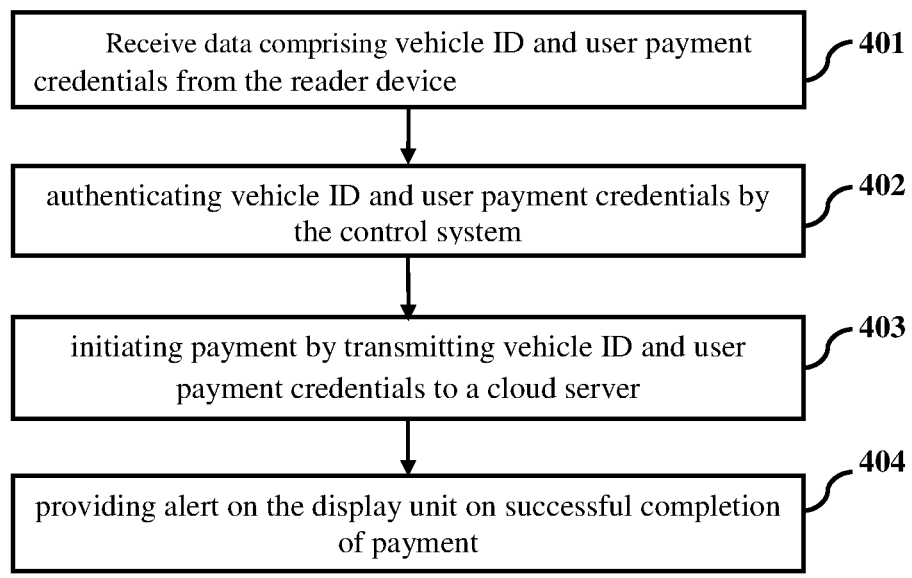
FIG. 4 illustrates a flowchart showing the operation of initiating payment and providing payment alert performed by the intelligent system according to an embodiment of the present disclosure.

FIG. 4 is a flowchart illustrating the operation of initiating payment and providing payment alert performed by the intelligent system. In accordance with an embodiment of the present disclosure, data comprising vehicle ID and user payment credentials are transmitted from the integrated glazing (401). The data is received by the reader device and the control system. In this example, the reader device is positioned internal or exterior to the vehicle. Further, the reader device is one of a mobile device or a handheld device or a toll booth device. Thereafter, the vehicle ID and user payment credentials are authenticated by the control system (402). To authenticate the user payment credentials, an application is triggered on a reader device or a mobile device. The user is requested to verify the payment credentials on the reader device or mobile device using one of OTP, password, fingerprint, biometric and the like. Once the user is authenticated, the payment is initiated by the control system by initiating a payment request a payment gateway (403). On completion of a payment operation, an alert (showing payment status) is displayed on the display unit of the integrated glazing (404). The payment can be utilized for operations such as toll booth payment, rental car payments, parking fee payment and the like.

In an exemplary embodiment, the intelligent system is used for rental car payments. Consider a scenario where a vehicle is taken on rent by a user for a period of time. The vehicle can be unlocked by the user on processing a payment. The user positions the mobile device near to the integrated glazing from outside the vehicle. The mobile device reads the vehicle ID from the integrated glazing using NFC and triggers an application to process payment. The application requires the user to enter details including his/her payment credentials and unique ID. On registering the user details on the mobile device, the user is verified using OTP, password, fingerprint, biometric and the like. The mobile device transmits verified user details to the control system. The control system communicates with a server through a payment gateway to initiate payment. Once payment is processed, the control system unlocks the vehicle. The successful payment is intimated to the user through the display unit (using LED, HUD, or EL) of the integrated glazing.

HVAC Control

Figure 5:
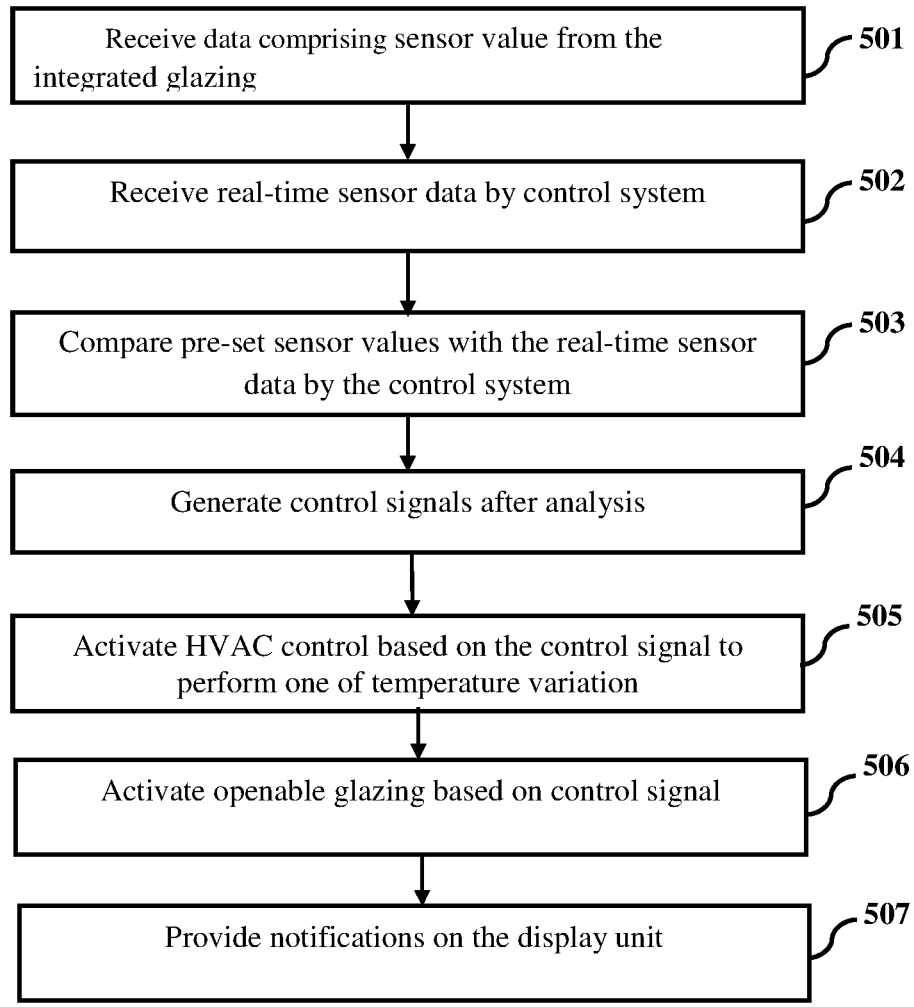
FIG. 5 illustrates a flowchart showing the operation of HVAC control and functional glazing control performed by the intelligent system according to an embodiment of the present disclosure.

FIG. 5 is a flowchart illustrating the operation of HVAC control and functional glazing control performed by the intelligent system. In accordance with an embodiment of the present disclosure, the data comprising pre-set sensor values of temperature, humidity, light, acoustic, vibration, stress, displacement, position, touch, force, occupancy, air-velocity, heat-flux, proximity, tire pressure, speed values are transmitted from the integrated glazing (501). Further, the real-time sensor data is received from the plurality of sensors by the control system (502). The plurality of sensors is positioned within the glazing or within the vehicle. The pre-set sensor values are compared with the real-time sensor data by the control system (503). The control signals are generated by the control system based on the comparison or analysis (504). Thereafter, the control system activates HVAC control based on the control signal to perform one of temperature variation or humidity variation. The control system also activates functional glazing control based on light and temperature variation (505). Further, sidelights (or openable glazing) is activated based on the control signal to regulate the incoming noise (506). The sidelight is controlled based on the noise levels detected by the acoustic sensor. The increase in noise levels (or dB levels) are determined and the sidelights/glazings are 'pulled up' to cut-off noise within the vehicle. The vehicle engine is activated or deactivated based on the control signal. For example, the engine is turned 'On' or turned 'OFF' based on the control signal. Finally, notifications are provided on the display unit corresponding to the status of temperature variation, humidity variation and light variation, and engine activation or deactivation (507).

In an embodiment, the intelligent system provides notifications on the display unit of the integrated glazing to display status and strength of Bluetooth connectivity, Wi-Fi, phone call notifications, VIN number, inspection status, pollution control status, insurance compliance status, navigation details and location information and the like. Further, the integrated glazing displays alert in one of red, blue or green color and emoticons indicating status of the pre-defined operations. The table below shows the notification on the display unit on performing at least one of the pre-defined operation:

TABLE 2

Display unit status for different operations.

| | Display unit (Glow) | | | |
|---|---|---|---|---|
| Position | Level 1 | Level 2 | Level 3 | Operations |
| A | Green | | Red | Payment completed |
| B | Green | Orange | Red | Speed limit |
| C | Green | Orange | | Wi-Fi indicator |
| D | Green | Orange | Red | Location |

TABLE 2-continued

Display unit status for different operations.

| Position | Display unit (Glow) | | | Operations |
| --- | --- | --- | --- | --- |
| | Level 1 | Level 2 | Level 3 | |
| E | | Orange | Red | boundary Proximity indicator |
| F | | Orange | Red | Tire pressure |
| G | | Orange | Red | Noise level |
| H | Green | | Red | Lock/Unlock |

According to an embodiment herein, the display unit may glow with a 'green' color on completion of the payment as shown in Table 2. In another example, the display unit glows with a 'green' color when a user is driving the vehicle within the prescribed speed limits. Further, the display unit glows with a 'red' color when a user is driving the vehicle outside the prescribed speed limits. Also, the display unit may glow with 'red' color on the failure of the payment. In another example, the display unit intimates a user with a 'green' color when the vehicle is unlocked. The display unit intimates a user with a 'red' color when the vehicle is locked. According to the basic construction described above, the display unit and the integrated glazing of the present invention may be subject to changes in materials, dimensions, constructive details and/or functional and/or ornamental configuration without departing from the scope of the protection claimed.

In an exemplary embodiment of the present invention, the intelligent system is configured to activate Wi-Fi within the vehicle. The method includes positioning a mobile/reader device near to an integrated glazing from inside the vehicle. The integrated glazing transmits data comprising a unique ID pertaining to the car. The reader device generates signals based on the received data, which further triggers applications to activate/deactivate Wi-Fi within the vehicle. In another example, the reader device instructs control system to activate/deactivate Wi-Fi within the vehicle.

In an exemplary embodiment of the present invention, the intelligent system is configured to activate actuators for heating, defogger and wiper control operations. The reader device receives data comprising pre-set sensor values of temperature, humidity, light, acoustic from the integrated glazing. The pre-set sensor values and the real-time sensor data is received by the control system for analysis and comparison. Based on the analysis, the actuator is activated for one of heating control, defogger and wiper control.

In another exemplary embodiment of the present invention, the intelligent system communicates with various components of the vehicle. For example, the control system communicates with one or more sensors present in the integrated glazing or present in the vehicle for detecting objects external to the vehicle such as other vehicles, obstacles in the roadway, traffic signals, signs, trees, and the like. Sensors may include lasers, sonar, radar, cameras or any other detection devices which record data to be processed by the control system. The control system may also communicate with the integrated glazing of the vehicle and may send and receive information from the various systems of vehicle, for example a braking system, an acceleration system, a signaling system, a navigation system, an alarm/lock system, emergency communication system and a mobile communications system in order to control the movement, speed, operation of vehicle. In case of an emergency, the sensors in the vehicle detect the stress and send alert to the control system, which further triggers message/call through the antenna in the integrated glazing.

In another exemplary embodiment of the present invention, the vehicle or the integrated glazing may also include an accelerometer, gyroscope or other direction/speed detection device to determine the direction and speed of vehicle or changes thereto. The directed and speed determined is displayed on the integrated glazing of the vehicle. Further, an increase in speed above a threshold limit is indicated on the integrated glazing using a red or orange color icon activated by EL displays.

In yet another exemplary embodiment of the present invention, the control system can be configured to control an infotainment system, for example comprising at least one information system and at least one entertainment system. The infotainment system can comprise a plurality of display screens and audio devices in a vehicle which can be operated independently. Further, the control system can thereby be used in a multi-user environment and switch between different on-board applications based on user preferred settings. The user preferred settings for entertainment system is programmable and stored in the integrated glazing.

Figure 6:
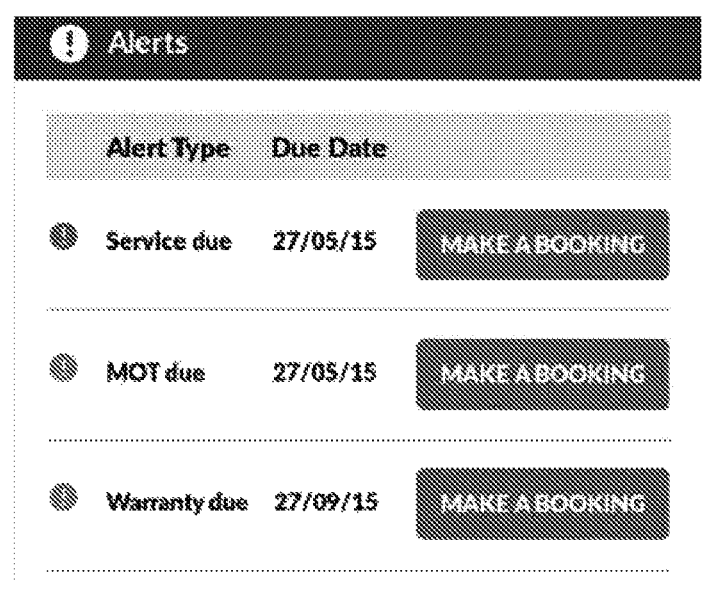

FIG. 6 illustrates an exemplary user interface with alerts/notifications, according to an exemplary embodiment of the present disclosure. The intelligent system provides notifications on the display unit 103 of the integrated glazing 100 to display status and strength of Bluetooth connectivity, Wi-Fi, phone call notifications, VIN number, inspection status, pollution control status, insurance compliance status, navigation details and location information and the like. Further, the integrated glazing displays alert in one of red, blue or green color and emoticons indicating status of the predefined operations.

Figure 7:
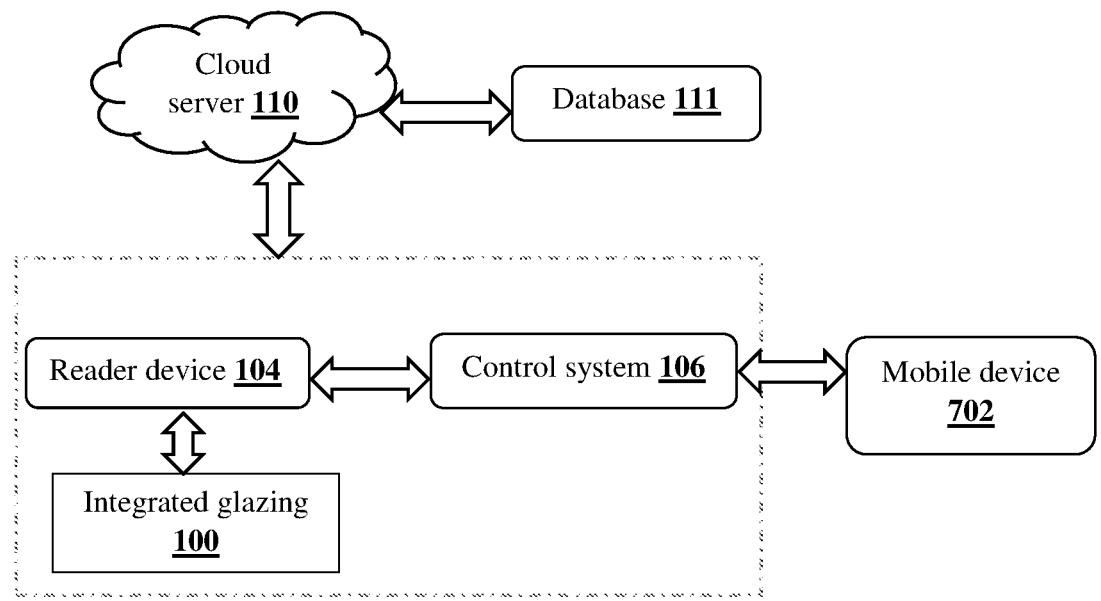
FIG. 7 illustrates an exemplary block diagram of the intelligent system communicating with the mobile device according to an embodiment of the present invention.

FIG. 7 illustrates an exemplary block diagram of the intelligent system communicating with the mobile device 702. With respect to FIG. 7, the intelligent system includes a reader device 104 that provides communication with the integrated glazing 100. The reader is one of a data acquisition system or mobile device or a handheld device or iPad or NFC/RFID reader device. The reader device 104 is a wired or wireless device depending on application requirements. The reader device 104 is configured to read data stored in the integrated glazing 100. The reader device is positioned within the vehicle or exterior to the vehicle. In response to the data received from the integrated glazing 100, the reader device triggers applications and further transmits the data and signals to the control system 106.

In an embodiment of the present disclosure, the control system 106 is communicably coupled to both the reader device 104, the integrated glazing 100 and the mobile device 702. In an embodiment, the control system 106 is positioned within the vehicle or at a location exterior to the vehicle. The control system 106 is also configured to communicate with a cloud server 110 or local server or a smart information device, which is external to the intelligent system. Optionally, the reader device 104, depending on type of data being handled may directly communicate to the cloud server 110 or local server or a smart information device (Data Storage & analytics system) which is external to the Smart system. The cloud server 110 is communicably coupled to a database 112 for storing server data received from the vehicle. Further, the cloud server 110 can retrieve server data and communicate with external control systems to perform vehicle operations.

In an exemplary embodiment of the present disclosure, the mobile device 702 communicates with the integrated glazing 100 to provide geo locations, dealer locations, service centers, and the like. The integrated glazing 100 communicates with the mobile device 702 to provide message alerts to the user regarding warranty information, entry and exit of vehicles, replacement requests, payment information and the like.

Figure 8:
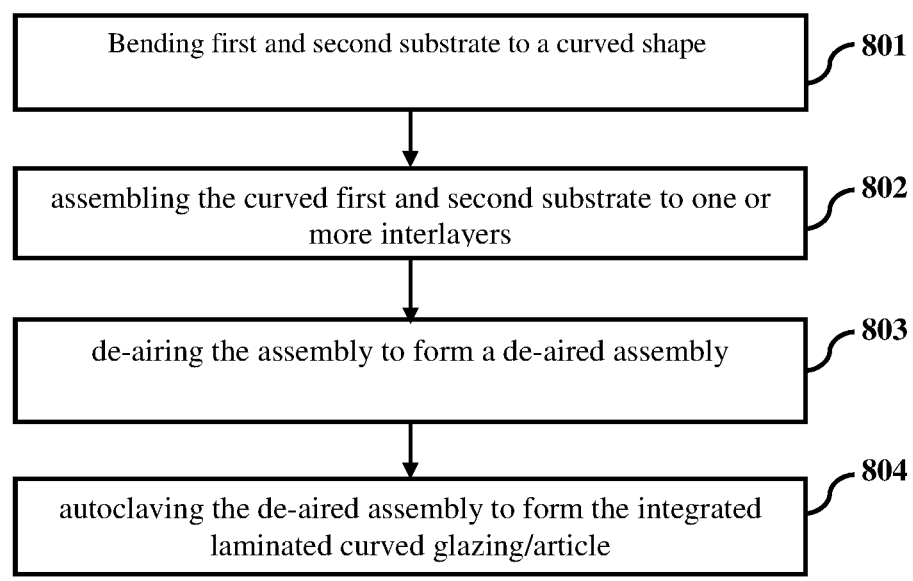
FIG. 8 illustrates a flowchart showing a method for production of integrated glazing according to an exemplary embodiment of the present disclosure.

FIG. 8 is a flowchart showing a method for production of integrated glazing 100, according to an exemplary embodiment of the present disclosure. The method includes bending first and second substrate [102a, 102b] to a curved shape (801). The curved first and second substrate are assembled to one or more interlayers, one or more data transponder devices and one or more display devices to form an assembly (802). The assembly is de-aired to form a de-aired assembly (803). Finally, the de-aired assembly is autoclaved to form the integrated laminated curved glazing/article (804). de-airing is carried out at temperature of at least 90° C. and negative pressure of at least 1 bar for time of at least 30 minutes. The de-airing is carried out at temperature of at least 90° C. and negative pressure of at least 1 bar for time of at least 45 minutes to accommodate variations due to data transponder and display devices. The autoclaving is carried out at temperature of at least 120° C. and pressure of at least 10 bar for time of at least 30 minutes. The autoclaving is carried out at temperature of at least 120° C. and pressure of at least 10 bar for time of at least 45 minutes to accommodate variations due to data transponder and display devices.

Further, one or more data transponder devices 102 and one or more display devices are disposed on the first substrate 100a, second substrate 100b or one or more interlayers 100c before bending (for flat laminated glass article). Alternatively, one or more data transponder devices 102 or one or more display devices are assembled simultaneously and/or sequentially disposed on first or second substrate, subsequently, requiring the modification the assembly process where the positioning of the data transponder devices is such that they do not overlap to prevent interference during communication and, similarly, the display devices are to be also placed such that the displays are not in the same direction resulting in blockage of one or more of the displays. one or more data transponder devices 102 or one or more display devices are optionally disposed on the first substrate 100a or second substrate 100b or the interlayer 100c by printing, adhesive bonding, placing/positioning for completion of the laminated glass article.

Additionally, the electrical interference caused by electronic circuitry is avoided when locating the data transponder device and display device. The method includes modifying one or more interlayers for accommodating one or more data transponder devices.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Certain features, that are for clarity, described herein in the context of separate embodiments, may also be provided in combination in a single embodiment. Conversely, various features that are, for brevity, described in the context of a single embodiment, may also be provided separately or in a sub combination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

The description in combination with the figures is provided to assist in understanding the teachings disclosed herein, is provided to assist in describing the teachings, and should not be interpreted as a limitation on the scope or applicability of the teachings. However, other teachings can certainly be used in this application.

As used herein, the terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Unless otherwise defined, all technical and scientific terms used herein have the same meaning as commonly understood by one of ordinary skill in the art to which this invention belongs. The materials, methods, and examples are illustrative only and not intended to be limiting. To the extent that certain details regarding specific materials and processing acts are not described, such details may include conventional approaches, which may be found in reference books and other sources within the manufacturing arts.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. An integrated glazing for performing pre-defined operations in a vehicle, the glazing comprising:
   one or more layers of glass;
   at least one data transponder embedded between the layers of glass, wherein the data transponder stores and processes data pertaining to vehicle configuration, vehicle ID/VIN Number, user ID, user payment credentials, user information, user customized/personalized settings, license details, service information, insurance details, website/URL, pre-defined location boundary information and location information;

a display unit comprising display elements disposed between the layers of glass, communicating with the data transponder;
a data channel coupled to the data transponder, wherein the coupling is one of wired or wireless communication; and
a power channel, wired or wirelessly integrated to the glazing.

2. The integrated glazing as claimed in claim 1, wherein the data transponder is one of a passive RFID, active RFID, passive NFC, active NFC, dual frequency data transponder and combinations thereof.

3. The integrated glazing as claimed in claim 1, wherein at least one of the data transponder is positioned on the outer layers of the glass.

4. The integrated glazing as claimed in claim 1, wherein the data transponder comprises an inbuilt antenna and a chip.

5. The integrated glazing as claimed in claim 1, further comprises one or more sensors embedded therein.

6. The integrated glazing as claimed in claim 1, wherein the one or more pre-defined operations comprising:
enabling a geo-fencing alert on the display unit of the integrated glazing;
initiating payment and providing payment alert on the display unit of the integrated glazing;
activating locking or unlocking of the vehicle;
activating HVAC control of the vehicle;
activating actuators for defogger and wiper control operations;
activating Wi-Fi within the vehicle;
speed limit alerts on the display unit of the integrated glazing;
triggering an emergency phone call or message by the control system through the integrated glazing based on the contact information stored therein; and
providing notifications and sensor data value indications on the display unit of the integrated glazing.

7. An intelligent system for performing pre-defined operations in a vehicle using the integrated glazing, comprising:
an integrated glazing as claimed in claim 1,
wherein the data comprises a permanent data and a variable data received from a sensor system of the vehicle, wherein the integrated glazing further transmits both the permanent data and the variable data;
a reader device communicably coupled to the integrated glazing to generate signals based on the received data; and
a control system communicably coupled to the integrated glazing and the reader device, wherein the control system comprises a memory and a processor, wherein the memory is configured to store instructions and the processor is configured to compare signals received from the reader device with a set of preferred limits to perform pre-defined operations in response to the instructions and received signals.

8. The system as claimed in claim 7, wherein the data transponder is one of a passive RFID, active RFID, passive NFC, active NFC, a dual frequency data transponder, and combinations thereof.

9. The system as claimed in claim 7, further comprises actuators coupled to the data transponder.

10. The system as claimed in claim 7, wherein the warranty information stored in the data transponder comprises warranty information about vehicle or glass warranty information.

11. The system as claimed in claim 7, wherein the integrated glazing is communicatively coupled to a mobile device for transmitting alerts and notifications.

12. The system as claimed in claim 7, is configured to communicate with another vehicle for transmitting alerts and notifications.

13. The system as claimed in claim 7, comprises:
a sensor system disposed on the vehicle and configured to generate sensor data, wherein the sensor system is communicably coupled with the integrated glazing and the control system, wherein the sensor data comprises temperature, humidity, light, acoustic, vibration, stress, displacement, position, touch, force, occupancy, proximity, tire pressure, speed values, IR/UV sensors, camera; and
a server wirelessly communicating with the reader device and the control system via the integrated glazing.

14. The system as claimed in claim 7, wherein the intelligent system is configured to perform one or more pre-defined operations comprising:
enabling a geo-fencing alert on the display unit of the integrated glazing;
initiating payment and providing payment alert on the display unit of the integrated glazing;
activating locking or unlocking of the vehicle;
activating HVAC control of the vehicle;
activating actuators for defogger and wiper control operations;
activating Wi-Fi within the vehicle;
speed limit alerts on the display unit of the integrated glazing;
triggering an emergency phone call or message by the control system through the integrated glazing based on the contact information stored therein; and
providing notifications and sensor data value indications on the display unit of the integrated glazing.

15. The system as claimed in claim 7, wherein enabling a geo-fencing alert operation by the intelligent system comprises:
transmitting data comprising current vehicle location and pre-defined location boundary information from the integrated glazing;
receiving data by the reader device;
processing data by comparing the current vehicle location with a pre-defined location boundary;
determining if there is a deviation in location based on the comparison; and
providing alert on the display unit of the integrated glazing when a deviation in location is determined, wherein alert comprises an active error.

16. The system as claimed in claim 7, wherein initiating payment and providing payment alert comprises:
transmitting data comprising vehicle ID and user payment credentials;
receiving the data by the reader device;
authenticating vehicle ID and user payment credentials by the control system;
initiating payment by the control system on sending request to a server through a payment gateway; and
providing alert on the display unit of the integrated glazing on successful completion of the payment.

17. The system as claimed in claim 7, wherein activating HVAC and functional glazing control of the vehicle by the control system comprises:
transmitting the data comprising pre-set sensor values of temperature, humidity, light, acoustic from the integrated glazing;

receiving the real-time sensor data from the plurality of sensors, wherein the plurality of sensors is positioned within the glazing or within the vehicle;

comparing the pre-set sensor values with the real-time sensor data by the control system;

generating control signals based on the comparison; and activating HVAC control based on the control signal to perform one of temperature variation or humidity variation;

activating functional glazing control based on light and temperature variation;

activating openable glazing control based on the control signal to regulate the incoming noise;

activating or deactivating a vehicle engine based on the control signal; and providing notifications on the display unit corresponding to status of temperature variation, humidity variation and light variation, and engine activation or deactivation.

18. The system as claimed in claim 7, wherein activating Wi-Fi within the vehicle comprises:

transmitting data comprising unique ID pertaining to the car, user, emergency contact data from the integrated glazing; and reader generating signals based on the received data and triggering applications to activate/deactivate Wi-Fi within the vehicle.

19. The system as claimed in claim 7, wherein providing notifications on the display unit of the integrated glazing comprises:

displaying status and strength of Bluetooth connectivity, Wi-Fi, phone call notifications, VIN number, inspection status, pollution control status, insurance compliance status, navigation details and location information; and displaying alerts in one of red, blue or green color and emoticons indicating status of the pre-defined operations.

20. The system as claimed in claim 7, wherein activating actuators for heating, defogger and wiper control operations comprises:

receiving the data comprising pre-set sensor values of temperature, humidity, light, acoustic from the integrated glazing;

receiving the sensor data from the plurality of sensors;

analyzing the pre-set sensor values with the sensor data; and activating actuator for one of heating control, defogger and wiper control based on the analysis.

21. A method for performing pre-defined operations in a vehicle using the intelligent system, as claimed in claim 7, wherein the method comprises storing data on the integrated glazing, wherein the data comprises a permanent data and a variable data received from a sensor system;

transmitting, by the integrated glazing, both the permanent data and the variable data to a reader device;

generating, by the reader device, signals based on the received data by the reader device, wherein the signals further trigger applications on the reader device; and analyzing, by the control system, the signals received from the reader device with a set of preferred limits to perform pre-defined operations in response to the instructions and received signals.

22. The method as claimed in claim 21, wherein the pre-defined operations are one of:

enabling a geo-fencing alert on the display unit of the integrated glazing;

initiating payment and providing payment alert on the display unit of the integrated glazing;

activating locking or unlocking of the vehicle;

activating HVAC control of the vehicle;

activating actuators for defogger and wiper control operations;

activating Wi-Fi within the vehicle;

speed limit alerts on the display unit of the integrated glazing;

triggering an emergency phone call by the control system through the integrated glazing based on the contact information stored therein; and providing notifications and sensor data value indications on the display unit of the integrated glazing.

23. The method as claimed in claim 22, wherein enabling a geo-fencing alert operation by the intelligent system comprises:

transmitting data comprising current vehicle location and pre-defined location boundary information from the integrated glazing;

receiving data by the reader device;

processing data by comparing the current vehicle location with pre-defined location boundary;

determining whether there is a deviation in location based on the comparison; and providing alert on the display unit of the integrated glazing when a deviation in location is determined, wherein alert comprises active error.

24. The method as claimed in claim 22, wherein initiating payment and providing payment alert comprises:

transmitting data comprising vehicle ID and user payment credentials;

receiving the data by the reader device;

authenticating vehicle ID and user payment credentials by the control system;

initiating payment by the control system on sending request to a server through a payment gateway; and providing alert on the display unit of the integrated glazing on successful completion of the payment.

25. The method as claimed in claim 22, wherein activating HVAC and functional glazing control of the vehicle by the control system comprises:

transmitting the data comprising pre-set sensor values of temperature, humidity, light, acoustic from the integrated glazing;

receiving the real-time sensor data from the plurality of sensors, wherein the plurality of sensors is positioned within the glazing or within the vehicle;

comparing the pre-set sensor values with the real-time sensor data by the control system;

generating control signals based on the comparison; and activating HVAC control based on the control signal to perform one of temperature variation or humidity variation;

activating functional glazing control based on light and temperature variation;

activating openable glazing control based on the control signal to regulate the incoming noise;

activating or deactivating a vehicle engine based on the control signal; and providing notifications on the display unit corresponding to status of temperature variation, humidity variation and light variation, and engine activation or deactivation.

26. The method as claimed in claim 22, wherein activating Wi-Fi within the vehicle comprises:
- transmitting data comprising unique ID pertaining to the car, user, emergency contact data from the integrated glazing; and
- reader generating signals based on the received data and triggering applications to activate/deactivate Wi-Fi within the vehicle.

27. The method as claimed in claim 22, wherein providing notifications on the display unit of the integrated glazing comprises:
- displaying status and strength of Bluetooth connectivity, Wi-Fi, phone call notifications, VIN number, inspection status, pollution control status, insurance compliance status, navigation details and location information; and
- displaying alerts in one of red, blue or green color and emoticons indicating status of the pre-defined operations.

\* \* \* \* \*